United States Patent Office 3,374,187
Patented Mar. 19, 1968

3,374,187
FLAME RETARDANT COMPOSITIONS PREPARED FROM HALOGENATED 1,2-MONOEPOXYCYCLO-DODECA-5,9-DIENE AND ADDUCTS THEREOF
David G. Hare, Bricket Wood, near St. Albans, England, and Robert J. Stephenson, Cwmbran, England, assignors to Monsanto Chemicals Limited, London, England, a British company
No Drawing. Filed Nov. 30, 1964, Ser. No. 414,887
Claims priority, application Great Britain, Dec. 6, 1963, 48,195/63
9 Claims. (Cl. 260—2.5)

ABSTRACT OF THE DISCLOSURE

The invention comprises a flame-retardant synthetic resin material comprising a synthetic resin and as flame-retarding agent a halogenation product of 1,2-monoepoxy-cyclododeca-5,9-diene or a halogenation product of an adduct of 1,2-monoepoxycyclododeca-5,9-diene with a phosphorus halide or with a compound containing a hydroxylic group. The flame-retardant resin material can be a foamable resin material or a foamed resin material, for instance, a foamable or a foamed polystyrene.

---

This invention relates to flame-retardant materials, and particularly to flame-retardant synthetic resin materials, as well as to certain new compounds that have been found to have flame-retardant properties.

Many synthetic resins, especially hydrocarbon resins such as polyethylene or polystyrene, have a tendency to burn in air and this is also noticeable when the resins are used in an expanded form such as for example foamed polystyrene. It has been proposed to reduce this tendency by adding a flame-retarding agent to the resin in order to impart to it flame-retardant properties. However, many compounds that would otherwise be good flame-retarding agents have a deleterious effect on the mechanical properties of the resin. It has for example been found difficult to produce a satisfactory flame-retardant foamed polystyrene containing a halogen-containing flame-retarding agent, because the mechanical properties of the polystyrene can be adversely affected, for instance there may be a tendency for the foamed polystyrene to be distorted or for it to collapse. Certain new flame-retardant synthetic resin compositions of improved mechanical properties have now been found.

The invention comprises a flame-retardant synthetic resin material comprising a synthetic resin and as flame-retaining agent a halogenation product of 1,2-monoepoxy-cyclododeca-5,9-diene or a halogenation product of an adduct of 1,2-monoepoxycyclododeca-5,9-diene with a phosphorus halide or with a compound containing a hydroxylic group.

The flame-retardant resin material can be a foamable resin material or a foamed resin material, for instance, a foamable or a foamed polystyrene.

Also part of the invention are the halogenation products as defined above, which are new compounds.

The process of producing these new compounds is included within the invention, that is to say a process in which 1,2-monoepoxycyclododeca-5,9-diene or an adduct of 1,2-monoepoxycyclododeca-5,9-diene with a phosphorus halide or with a compound containing a hydroxylic group is treated with a halogenating agent.

Preferably the halogenation product is that of an adduct of the monoepoxycyclododecadiene with a phosphorus halide or with a compound containing a hydroxylic group. A phosphorus halide and a compound containing a hydroxylic group can be present together in the adduct if desired; for instance the monoepoxycyclododeca-diene can be reacted first with a phosphorus halide and then with a hydroxylic-group-containing compound.

The resin can be any synthetic resin that can advantageously be given a degree of flame-retardancy, but is usually a polymer or copolymer of an ethylenically unsaturated monomer, especially a hydrocarbon monomer, for example ethylene, propylene, butylene or a styrene such as for instance styrene itself or alpha-methylstyrene. Other suitable monomers are acrylates, such as methyl methacrylate, and vinyl esters, such as vinyl acetate. Other resins that can be used include copolymers of any of the above monomers, for instance with acrylonitrile, butadiene or isoprene, as well as mixtures of two or more of the polymers or copolymers. The process is particularly applicable to polystyrene resins, including polystyrene itself or a toughened polystyrene of the kind that incorporates a minor proportion of a natural or synthetic rubber. The synthetic resin can be one containing a blowing agent such as a volatile nonreactive organic compound having an atmospheric boiling point of less than about 80° C. with the preferred boiling point being in the range of about −10° C. to about 80° C. and having, at most, a slight solvent action on the thermoplastic styrene polymer included in the compositions of this invention. Examples of volatile non-reactive organic compounds which can be employed as a blowing agent are the aliphatic hydrocarbons such as propane, butane, isobutane, pentane, hexane, isohexane, cyclohexane, etc.; certain halogenated aliphatic hydrocarbons such as ethyl chloride, propyl chloride, butyl chloride, isopropyl bromide and particularly the perchlorofluorocarbons such as dichlorodifluoromethane, monochlorotrifluoromethane, trichloromonofluoromethane, 1,1,2,2-tetrachloro-1,2-difluoroethane, and the corresponding perchlorofluorocarbons as set forth in U.S. 2,848,428; aliphatic amines such as ethylamine, propylamine, isopropylamine, butylamine, dimethylamine, diethylamine, etc.; aliphatic ethers such as diethyl ether, diisopropyl ether, methyl ethyl ether, ethyl isopropyl ether, etc.; acetaldehyde, etc. For a listing of other volatile organic foaming agents that can be employed see U.S. 2,681,321. The preferred blowing agent employed in the practice of this invention is n-butane.

It is feasible and in some cases desirable to employ mixtures as the volatile organic foaming agent wherein the mixtures consist predominantly of a volatile non-reactive organic blowing agent of the type described above with minor amounts of an organic compound having a solvent action on the thermoplastic styrene polymers included in the composition of this invention. Typically, such mixtures will contain 70–99% by weight of the volatile non-reactive organic blowing agent and, correspondingly, 30–1% by weight of the organic compound having a solvent action on the thermoplastic styrene polymers. Typical of the organic compounds having such a solvent action and which can be employed in admixture with a volatile non-reactive organic blowing agent are acetone, methylene chloride, styrene monomer, benzene, xylene, carbon tetrachloride, chloroform, etc. Preferably, the organic solvent should have a boiling point not higher than about 80° C.

In general in the flame retarding agents of the invention the halogen is preferably chlorine or more preferably bromine, and it is believed to be substituted in the 12-membered carbocyclic chain as a result of additive bromination at either double bond of the cyclododecadiene ring. More than one halogen atom can be, and preferably is, present.

Suitable phosphorus halides include for example those of the formulae $PX_3$, $PX_5$ and $POX_3$ where X is a halogen, preferably chlorine or bromine.

Where the adduct-forming compound is one containing a hydroxylic group this can be a hydroxyl group as in an alcohol or a phenol, or a hydroxyl group present in a carboxyl or sulphonic radical or in an organic phosphonic radical. Adduct-forming compounds containing phosphorous as well as a hydroxylic group are especially useful and include phosphorus acids and their partial esters, such as for example phosphorous and phosphoric acids and the mono- and diaryl and mono- and dialkyl phosphates and phosphites. Water can also be used. Preferably, however, the compound containing a hydroxylic group is an alcohol. Alcohols that can be used include for instance the lower alkanols, for example methanol, ethanol, isopropanol, n-butanol; higher alcohols, for example octanol, lauryl alcohol, cetyl alcohol; di- and polyhydric alcohols, for example ethylene glycol, glycerol, neopentyl glycol and sorbitol; and preferably unsaturated alcohols, for example allyl alcohol crotyl alcohol, propargyl alcohol and butyne diol. Unsaturated alcohols containing a polymerizable vinyl or allyl groups are often very useful. Other organic adduct-forming compounds containing a hydroxylic group include the carboxylic acids, especially unsaturated acids such as for example maleic and fumaric acids, and phenols including phenol itself or resorcinol. Any of these organic adduct-forming compounds can be substituted with one or more halogen atoms if desired.

An adduct can very often be produced simply by heating the monoepoxycyclododecadiene and the other component together, for instance under reflux, and if desired in the presence of a suitable solvent. The adduct can then be halogenated in the way described below.

The halogenation is effected by treating the monoepoxycyclododecadiene (or its adduct) with a halogenating agent. The halogens themselves, especially chlorine or bromine, are preferred, but such halogenating agents as iodine chloride or N-bromosuccinimide can be employed if desired. It is not normally necessary to heat the reactants, and halogenation can usually be effected at room temperature. The use of an inert solvent is often desirable, and the lower alkanols such as for example methanol or ethanol are usually suitable for this purpose. After the reaction the flame-retarding agent can be recovered from the solution by evaporation of the solvent or by pouring the reaction mixture into water and so precipitating the flame-retarding agent.

The flame-retarding agent can be added to the synthetic resin in any convenient way, for example by mixing in a mill or an extruder, but a method which often presents practical advantages is to coat particles of the resin with a thin surface layer that comprises the flame-retarding agent. Particles of resin that can be used are for example those that result from extruding the resin into a strand that is then chopped up, or those resulting directly from a suspension polymerization process. Foamable polystyrene beads can be treated effectively. The particles of resin can for example be coated by "tumbling" them in a drum with an appropriate quantity of flame-retardant agent and if desired an adhesive such as an oil or wax. In other instances the resin particles can be treated with an aqueous dispersion of the flame-retarding agent so that a surface coating is applied, for instance by coagulating the dispersion.

The amount of flame-retarding agent employed depends on several factors, including the identity of the halogen it contains and the degree of flame-retardancy that it is desired to impart to the synthetic resin, but in general it is preferable to employ sufficient of the agent for the resin material to contain on average between 0.5 and 5%, especially 1 to 3%, such as about 2%, by weight of bromine, or between 2 and 20%, especially between 5 and 15%, by weight of chlorine, based on the weight of the resin.

The invention is illustrated by the following examples.

EXAMPLE I

This example describes the bromination product of an adduct of 1,2 - monoepoxy-cyclododeca - 5,9 - diene with phosphorus trichloride.

The adduct was first produced by adding 23 grams of phosphorus trichloride during 30 minutes to 89 grams of stirred 1,2-monoepoxycyclododeca-5,9-diene at 120° C. and holding the mixture at that temperature for a further 20 minutes. 11.0 grams of the adduct were then dissolved in 150 cc. of ethanol (as inert solvent) and to the stirred solution was slowly added 5.2 cc. of bromine, the temperature being maintained not higher than 25° C. After completion of the reaction the mixture was poured into cold water resulting in the precipitation of 23.0 grams of a white powder which was filtered off and dried at 80° C. The bromination product contained 61.4% by weight of bromine.

EXAMPLE II

This example describes the bromination product of an adduct of 1,2-monoepoxy-cyclododeca-5,9-diene with phosphorus trichloride and but-2-yne-1,4-diol.

9.0 grams of 1,2-monoepoxycyclododeca-5,9-diene and 6.93 grams of phosphorus trichloride were mixed at room temperature and heated to 95° C. for 1½ hours. The mixture was then cooled to room temperature and after addition of 4.3 grams of but-2-yne-1,4-diol was reheated to 95° C. for 20 hours in a stream of nitrogen. The mixture solidified on cooling. The adduct was dissolved in 250 cc. of methanol and 31 grams of bromine were added drop by drop to the stirred solution at room temperature. After completion of the reaction the mixture was poured into cold water, resulting in the precipitation of 25.0 grams of a white powder which was filtered off and dried at 80° C. The bromination product contained 56.4% by weight of bromine.

EXAMPLE III

This example described polystyrene compositions comprising the bromination products of Examples I and II respectively as flame retarding agent, and demonstrates their flame-retardant properties in comparison with compositions containing the established commercial flame-retarding agent tris(2,3-dibromopropyl) phosphate.

The compositions were made by dissolving polystyrene in benzene and adding an appropriate flame-retarding agent, a film of polystyrene 0.01 centimeter thick then being cast from the benzene solution. Several compositions were made and cast into films containing amounts of flame-retarding agents ranging from 0 to 8% by weight.

The burning properties of the films were examined by cutting them into strips 10 centimeters x 1 centimeter which were supported in still air with the long axis horizontal and the 1-centimeter axis vertical, and repeatedly ignited at one end, the length of the strip consumed before the flame was extinguished being measured each time. The average of a number of experiments was found for each composition. An average burning length of 4 centimeters in this test represents sufficient flame-retardancy for a foamed resin produced from the tested composition to be self-extinguishing.

It was found that the amounts of the bromination product of Examples I and II respectively required to impart this degree of flame-retardancy were 4.1 and 4.4% by weight of the composition, whereas 5.0% by weight of tris(2,3-dibromopropyl) phosphate was required to achieve comparable results. The softening points of these three compositions were respectively depressed by 1.4° C., 1.1° C. and 6.6° C. compared with that of the polystyrene alone.

It can therefore be seen that the flame-retarding agents of the invention are more efficient and cause less depression of softening point than the established commercial additive. Strips of polystyrene produced as above, but without any additive, were completely burned away at the first ignition.

What is claimed is:

1. A flame-retardant synthetic resin material comprising a synthetic resin and a flame-retarding agent which is selected from the group consisting of a halogenation product of 1,2-monoepoxycyclododeca-5,9-diene, a halogenation product of an adduct of 1,2-monoepoxycyclododeca-5,9-diene with a compound selected from the group consisting of a phosphorus halide and a compound containing a hydroxylic group, and mixtures thereof.

2. The composition of claim 1 in which the halogen is bromine.

3. The composition of claim 1 in which the halogenation product is that of an adduct of the monoepoxycyclododecadiene with a phosphorus halide.

4. The composition of claim 1 in which the adduct is that of the monoepoxycyclododecadiene with phosphorus trichloride.

5. The composition of claim 1 in which the adduct is that of the monoepoxycyclododecadiene with an alcohol.

6. The composition of claim 5 in which the alcohol is but-2-yne-1,4-diol.

7. The composition of claim 1 in which the synthetic resin is a foamable styrene polymer containing a blowing agent.

8. The composition of claim 1 in which the synthetic resin is selected from the group consisting of polymers and copolymers of ethylenically unsaturated monomers.

9. The composition of claim 8 in which the monomer is styrene.

References Cited
UNITED STATES PATENTS

| | | | |
|---|---|---|---|
| 3,014,928 | 12/1961 | Wilke | 260—348 |
| 3,039,977 | 6/1962 | Ingram | 260—2.5 |
| 3,093,599 | 6/1963 | Muellertamm | 260—2.5 |

MURRAY TILLMAN, *Primary Examiner.*

SAMUEL H. BLECH, *Examiner.*

J. T. GOOLKASIAN, *Assistant Examiner.*